United States Patent [19]
Crockett et al.

[11] Patent Number: 5,945,014
[45] Date of Patent: Aug. 31, 1999

[54] METHOD OF ARC WELDING HEAVY STEEL PLATES

[75] Inventors: Dennis D. Crockett; Bruce E. Fulmer, both of Mentor; Robert J. Sowko, Wickliffe, all of Ohio

[73] Assignee: Lincoln Global, Inc., Cleveland, Ohio

[21] Appl. No.: 09/002,625

[22] Filed: Jan. 5, 1998

[51] Int. Cl.⁶ .................................................. B23K 9/09
[52] U.S. Cl. ...................................... 219/137 PS; 219/73
[58] Field of Search ........................ 219/137 PS, 130.21, 219/130.51, 137 R, 160, 73

[56] References Cited

U.S. PATENT DOCUMENTS

| | | | |
|---|---|---|---|
| 3,517,155 | 6/1970 | Mantel et al. | 219/137 R |
| 3,531,619 | 9/1970 | Broodman | 219/137 PS |
| 3,549,856 | 12/1970 | Saenger, Jr. | 219/137 R |
| 3,581,039 | 5/1971 | Kanzaki et al. | 219/73 |
| 3,662,144 | 5/1972 | Haeck | 219/137 R |
| 4,246,463 | 1/1981 | Shutt et al. | |
| 4,733,051 | 3/1988 | Nadeau et al. | 219/130.21 |
| 5,155,330 | 10/1992 | Fratiello | |
| 5,278,390 | 1/1994 | Blankenship | |
| 5,493,097 | 2/1996 | Gustafsson et al. | 219/137 R |

*Primary Examiner*—Clifford C. Shaw
*Attorney, Agent, or Firm*—Vickers, Daniels & Young

[57] ABSTRACT

A method of welding together two steel plates with a thickness greater than about ⅜ inches from one side of the plates, the method comprising the steps of: tapering a generally straight edge of the plates to form an included angle in the range of about 40–60° with a nose at the protruding portion of each edge; positioning the plates with the edges spaced from each other to define an elongated channel with the nose of each edge at the bottom of the channel and spaced from each other to define an elongated generally straight gap with a width g; moving an electrode having a diameter of less than approximately 0.05 inches at a wire feed speed of at least about 450 inches per minute along and in the channel and slightly above the bottom noses; applying a DC current passed between the electrode and the noses to cause an arc welding process to melt the electrode and the noses to form a root pass in the lower area of the channel at the gap and between the edges of said plates; controlling the DC current to control the output in a desired fashion to deliver a set of current pulses, the pulses being formed at a given rate and by a multitude of closely spaced current segments having controlled magnitudes to determine, with the rate, the energy delivered by the current pulses; and, adjusting travel speed to accommodate variations in the gap between the plates being joined and/or the current pulses to prevent overheating at the root pass.

27 Claims, 3 Drawing Sheets

METHOD OF ARC WELDING HEAVY STEEL PLATES

The present invention relates to the art of joining two heavy steel plates and more particularly to a method of arc welding heavy steel plates of the type used in offshore oil rigs and for ship construction.

INCORPORATION BY REFERENCE

The arc welding method of the present invention involves the use of a particular welding operation which can be performed by a commercial unit known as a PowerWave sold by The Lincoln Electric Company of Cleveland, Ohio and generally disclosed in Blankenship U.S. Pat. No. 5,278,390 which is incorporated by reference herein. A power supply of the type used in the present invention creates a series of wave forms, each of which is comprised of a multitude of closely spaced current segments having an accurately controlled magnitude. By adjusting the magnitude of the various adjacent sections, a wave form of the desired shape can be created. The creation of this wave shape by a number of current segments utilizes an inverter type power supply. Of course, a wave shape of the type to which the present invention is directed and as created by a power supply in The Lincoln Electric PowerWave family, can be produced by a down chopper or other switching type power supplies.

One side arc welding has been practiced for many years. Examples of such technology is disclosed in Shutt U.S. Pat. No. 4,246,463 and Fratiello U.S. Pat. No. 5,155,330, which are incorporated by reference as background to the present invention.

BACKGROUND OF INVENTION

When joining heavy steel, it is advantageous to perform the arc welding process from a single side with the plates generally horizontal so the electrode used to deposit metal can move along the flat heavy plates at the joint between the edges of the plate to perform the joining operation. This type of plate welding is used for making large oil rigs which require large segments of steel plates to be joined together for constructing the pontoon area of the oil rigs. It is also used in shipbuilding for ship hulls and deck plate.

The present invention is directed to a single side type of welding operation for joining two heavy steel plates having their edges butted together. These plates have a tapered edge to define a channel. Below this channel is a copper backing strip with a recess machined into it to accommodate the addition of a backup flux. This recessed cavity is filled with a granular flux to help form the back side of the weld bead as the root pass or first layer of molten metal is applied along the bottom portion of the channel between the edges of the heavy steel plates. Other mediums, such as fiber tape and ceramic tile, may also be used to form the backside of the weld bead.

In the past, there was substantial difficulty in making the root pass such that the metal would not blow through into the flux compromising the root pass integrity and consistency. When a single electrode was used to deposit the root pass between the heavy steel plates, the heat generated in the lower area of the channel between the plates caused a burn through. Consequently, the punch through problem was solved by The Lincoln Electric Company in its modified series arc process wherein two adjacent electrodes were employed for the root pass arc welding process, as shown in Shutt U.S. Pat. No. 4,246,463. This allowed a softer arc welding approach wherein the first electrode primarily deposited the molten metal between the edges of the plate and melted the plates, while the electrode followed behind the first electrode spreads out the molten metal to form an acceptable bead profile in the root pass. In some instances, even a third trailing electrode was used so that the necessary metal was deposited for the root pass without requiring the high heat energy adjacent any one of the electrodes. This process was used successfully; however, it is extremely complex. The use of a simple process for creating the root pass between the edges of heavy steel plates which was reproducible and did not cause cracking or overheating was desired but not available.

THE PRESENT INVENTION

The disadvantages of prior efforts to create a root pass between the edges of heavy steel plates using a single electrode has been overcome by the present invention wherein a small diameter, gas shielded electrode, solid or cored, is delivered along the joint seam between the edges of the plate and has a controlled heat input allowing use of only a single electrode for producing the desired root pass. This root pass can be created without blow through and without overheating of the weld bead forming the root pass or the base metal being joined.

In accordance with the present invention there is provided a method of welding together two steel plates with a thickness of about ⅜" or greater which welding process is performed from one side of the plates as they are positioned together. This method of welding comprises the steps of tapering a generally straight edge of the plates to form an included angle in the general range of about 40–60° with a nose on each edge located at the lower area of the plate. The plate is then positioned with the edges spaced from each other to define an elongated channel with the nose of each edge of the strip at the bottom of the channel and spaced from each other to define an elongated generally straight gap with a width which in practice is between 0.03 and 0.12 inches. After the edges of the heavy plates are positioned together with a slight gap between the lower nose portions of the edges, a backing layer of granular flux is located below the gap in the channel to be welded. This granular flux is held in a cavity in an elongated copper backing bar commonly used in welding heavy steel sheets. This flux is held firmly against the underside of the weld joint to ensure that the flux will fully support and properly form the weld bead. Pressurized systems are often used for this purpose. The single electrode having a diameter of approximately 0.05 inches or less is moved along said channel at a travel speed of 8 to 25 inches/minute at the lower part of the channel adjacent the noses forming the gap between the channels. The wire feed speed is at least 450 inches/minute. While the single electrode is being moved above the gap and in the channel, a DC current is passed between the electrode and the noses, forming the gap, causing an electric arc welding process which melts the electrode and a portion of the nose, thus forming the root pass in the lower area of the gap between the edges of the plates. In accordance with the invention, the DC current is controlled to create a generally continuous output in a desired fashion to deliver a set of current pulses. The pulses are formed at a given rate or period and are created by a multitude of close spaced current segments having controlled magnitudes to determine, with the rate of the pulses, the energy created by the current pulses. In this manner, current pulses can be adjusted to prevent overheating in the lower area of the root pass as the root pass is being created. This invention has proved extremely successful in creating a high integrity root pass between the noses of heavy steel plates.

Adjusting steps can be performed during the arc welding process as it is progressing so that accurate control is maintained over the arc welding process used to deposit the root pass in the lower area of the channel between the two adjacent heavy steel plates. For example, the weld travel speed can be adjusted to accommodate variations in the gap between the plates being joined. Slower travel speeds can be used to better weld wider gaps while faster travel speeds are better suited for narrower gaps. The wave shape can also be adjusted to optimize the final weld quality. In prior efforts to use a single electrode to deposit the root pass, a high DC current over 300 amperes was used with a relatively large diameter electrode with the submerged arc welding process. This did deposit a lot of metal in the root pass; however, the root pass was overheated and penetration was not consistently controlled, which led to imperfections when the weld metal solidified. In addition, slag removal was often very difficult. The present invention does not use a large electrode but a relatively small electrode having a diameter of approximately 0.05 inches or less. It has been found that this size electrode moved at a relatively fast rate with controlled heat fills the gap between the nose portions of the edges of the heavy plates, even though the gap varied between 0.03–0.12 inches. In practice, the electrode wire feed speed during welding is in the general range of 450–550 inches/minute so that the electrode wire is fed into the welding process at a rate which is fairly high, but there is no concentration of heat when using a high wire feed speed with a small diameter. To further control the heat, a pulse arc welding process is employed so that the individual pulses can be controlled by the power supply. A power supply accomplishing this objective is sold by The Lincoln Electric Company of Cleveland, Ohio under the trademark Power-Wave. Of course, background current which is continuous D.C. current applied between the electrode and the heavy plates can be adjusted to give at least a minimum heat between the controlled current pulses. In this manner, the arc is always sustained without the need for high inductance which is counterproductive to accurately forming the wave shapes of the individual pulses used in the arc welding process.

To fill the channel after the root pass has been laid, the method of the present invention also includes the concept of providing a submerged arc welding process coordinated with, and performed behind in a delayed fashion, the single electrode root pass arc welding process of the invention. If there is a need for additional metal in the channel between the plates, an additional submerged arc welding process is employed.

The primary object of the present invention is the provision of a method for providing the root pass between heavy steel plates, which method uses a single electrode wire, but does not cause undue blow through or overheats the metal forming the root pass, or the base material, during the welding operation.

Another object of the present invention is the provision of a method, as defined above, which method utilizes a small diameter electrode moved along the gap between the heavy plates using a DC pulse arc welding current to control the heat of the metal in the root pass.

Yet another object of the present invention is the provision of a method, as defined above, which method utilizes a single electrode to deposit the root pass and controls the heat in the root pass to assure the integrity of the solidified root pass.

These and other objects and advantages will become apparent from the following description taken together with the following drawings:

BRIEF DESCRIPTION OF DRAWINGS

The following drawings illustrate the preferred embodiment of the present invention.

PREFERRED EMBODIMENT

Figure 1:
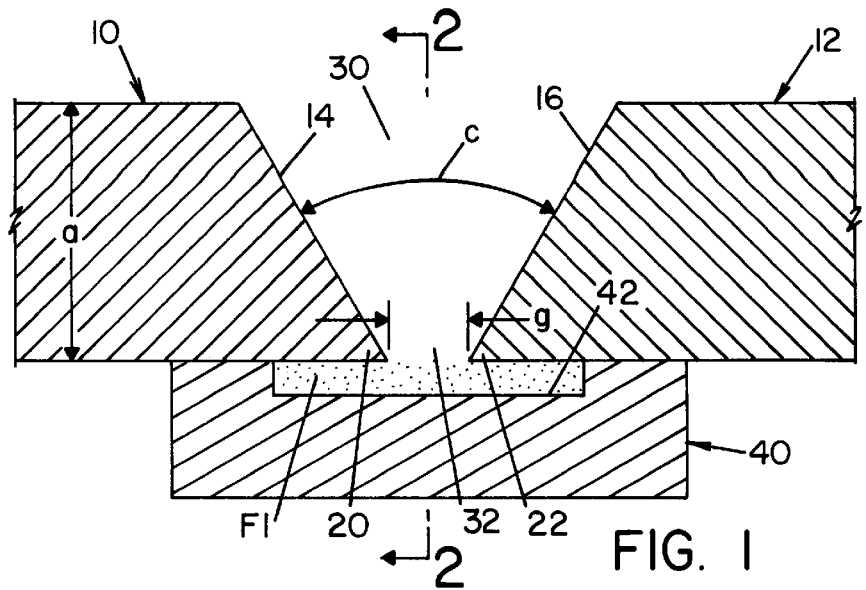
FIG. 1 is an enlarged cross sectional view illustrating the heavy steel plates positioned for arc welding in accordance with the present invention.
Figure 2:
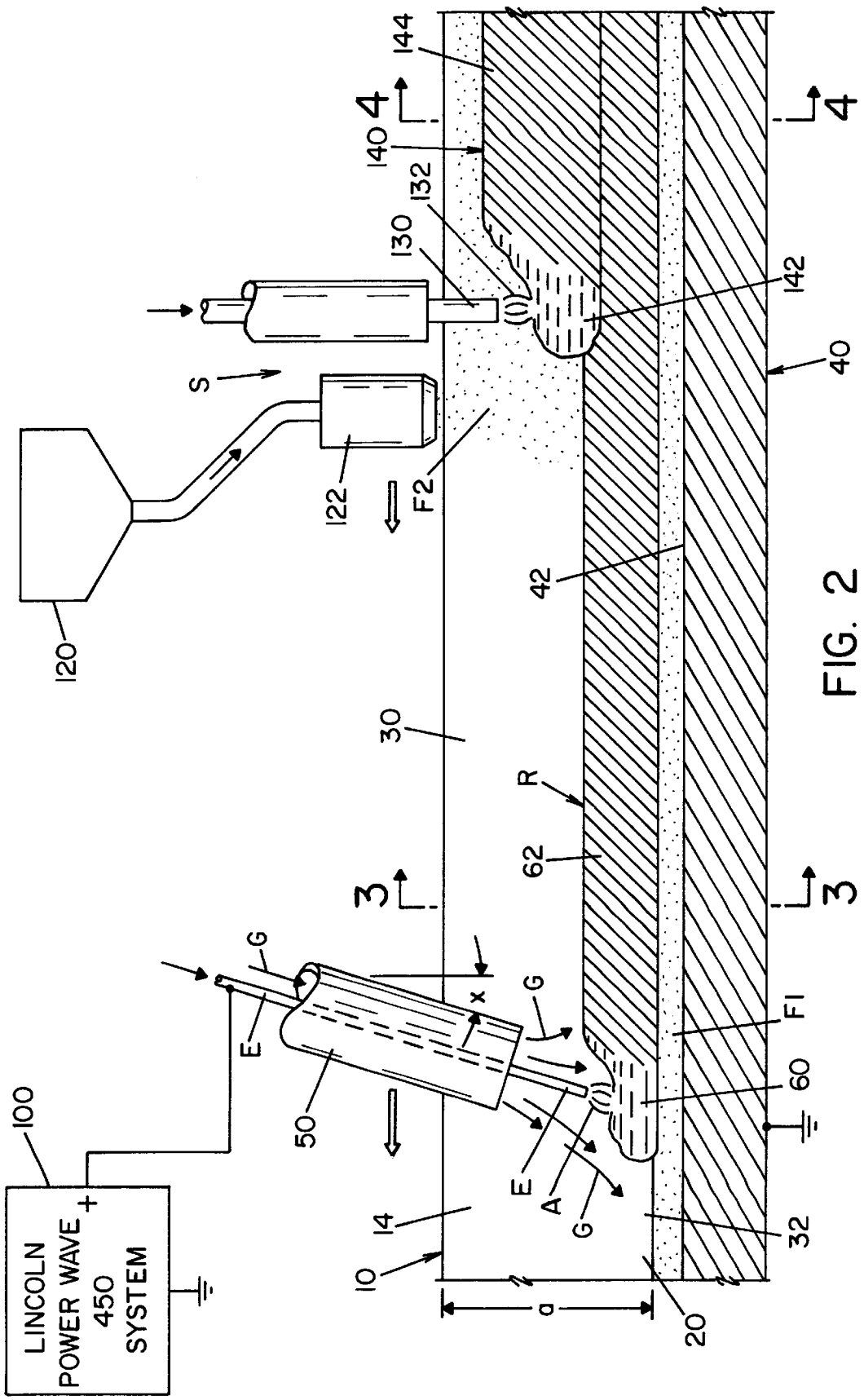
FIG. 2 is a cross sectional view taken generally along line 2—2 of FIG. 1 including an illustration of the single electrode welding torch for depositing the root pass and an optional submerged arc process used in accordance with an aspect of the present invention.

Referring now to the figures wherein the showings are for the purpose of illustrating a preferred embodiment of the invention only and not for the purpose of limiting same, FIG. 1 shows two heavy steel plates 10, 12 with a thickness a of at least ⅜". Plates 10, 12 are to be joined by adjacent edges 14, 16, which edges are cut at a taper angle to define lower noses 20, 22 which are spaced from each other a distance g which in practice is between 0.30 and 0.12. The included angle c is in the range of 40–60° with the angle being greater as the plate thickness decreases. For a thickness less than or equal to a ½", the included angle is approximately 60°. For greater thicknesses, the included angle is 45°. Spaced between the edges of plates 10, 12 is channel 30 having a lower area, or root area, 32 defined between edge noses 20, 22 at gap g. A backing block 40 formed from copper and, in accordance with standard practice, including an elongated cavity 42 cut in the block and filled with a granular flux F1 that defines the back surface of channel 30 at gap g or lower area 32. By holding the plates together, as shown in FIG. 1, the plates are prepared to receive the root pass, which pass is a solidified metal portion between noses 20, 22. The metals of electrode E on noses 20, 22 are melted during the welding process to form a composite integral solidified steel mass or weld bead referred to as the root pass. In accordance with the invention, the root pass is produced by using a single electrode E, as shown in FIG. 2, wherein an arc welding torch 50 of general standard design is moved along channel 30 adjacent lower area 32 with a push angle x which in practice is in the range of 15–20° forward. Electrode E passes through torch 50 together with a shielding gas G which is normally a mixture of Argon and $CO_2$ to shield the electric arc A that is used to melt the electrode E and plate noses 20, 22 for depositing a molten metal from the electrode into the gap area between plates 10, 12 to create root pass R having a molten portion 60 and a solidified portion 62. As the electrode E passes through torch 50 a power supply 100 creates a DC current through the electrode to the plates, which is illustrated to be electrically negative or grounded, and ultimately to lower backing block 40. The current flow melts the amount of electrode wire extending from torch 50 to create the molten portion of root pass R. As the electrode is moved to the left at a rate in the range of 8–25 inches/minute, additional material is melted from the electrode feed into the process at a rate of at least 450 inches/minute. This molten metal is deposited in the lower area or root area 32 between noses 20, 22. This action melts the noses 20, 22 and creates the root pass R that is solidified to join the edges 14, 16 of the heavy metal plates. As will be explained later, power supply 100 operates to produce a series of pulses of DC current, which pulses are adjusted to control the heat in the formation of the root pass without allowing the arc A to be extinguished and without overheating the molten metal forming the root pass or blowing out molten metal from the back of the heavy plates. The use of the unique DC current for the single electrode, root pass arc welding process allows the single electrode to rapidly produce the root pass without the disadvantages previously experienced by using large electrodes, usually two or more, and high DC currents. In practice The Lincoln Electric PowerWave power supply is employed. This power supply is generally disclosed in Blankenship U.S. Pat. No. 5,278, 390, incorporated by reference herein. The invention is directed toward the use of a single electrode for creating the root pass R from a single side of heavy plates 10, 12. Heretofore, this objective has not been obtainable in the field.

To fill the remainder of channel 30 above root pass R, another aspect of the invention includes the optional implementation of a submerged arc welding process S, also shown in FIG. 2. In accordance with this standard process, a hopper 120 includes a flux F2 which is directed through delivery chute 122 into channel 30 behind electrode E. Flux F2 is deposited in the channel above the solidified portion 62 of root pass R. Directly behind delivery chute 122 is a submerged arc electrode 130 utilizing a DC power supply to produce a continuous arc 132 which melts electrode 130 as it is moved downwardly toward root pass R. An AC power supply may also be used. Electrode 130 melts rapidly forming a weld deposit 140 below flux F2 which deposit includes a molten portion 142 followed by a solidified portion 144. In practice, if the optional submerged arc process is employed, the two welding operations are moved in unison at a sufficient spacing so that the submerged arc process does not interfere with the critical root pass process.

Figure 3:
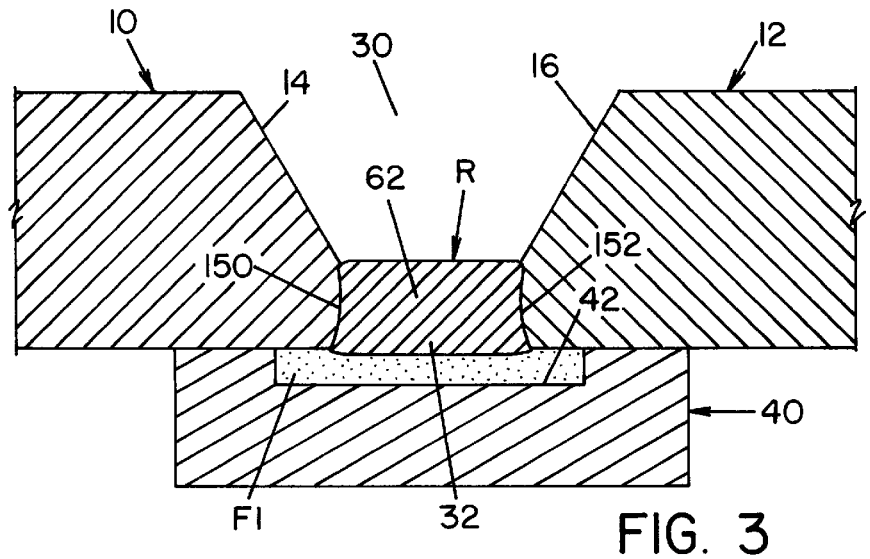
FIG. 3 is a partial cross sectional view taken generally along line 3—3 of FIG. 2.
Figure 4:
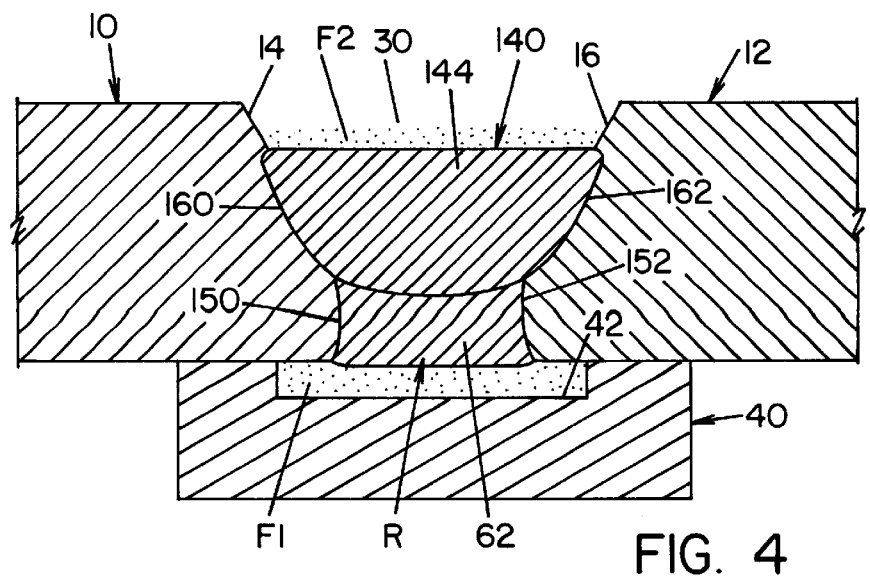
FIG. 4 is a partial cross sectional view taken generally along line 413 4 of FIG. 2; and, FIG. 5 is a current graph illustrating the pulsed DC arc welding current used in accordance with the present invention.

As shown in FIG. 3, when root pass R is formed, the noses 20, 22 are melted as indicated by portions 150, 152. Thus, the root pass is a solidified mass incorporating both metal from the electrode and metal from plates 10, 12. The electrode, in practice, is either a solid wire with the desired metallurgical characteristics or a cored wire wherein the core of the electrode provides the desired alloy composition and any elements for arc stabilization that might serve to enhance the welding characteristics. In a like manner, as indicated in FIG. 4, the edges 14, 16 of plates 10, 12 are melted by the submerged arc welding process S to form portions 160, 162 in the weld deposit 140. If the submerged arc process S does not completely fill channel 30, a subsequent filling process is used. The single electrode arc welding process shown at the left of FIG. 2 and in FIG. 3 is the basic aspect of the present invention. The procedure for filling the rest of the channel is not as critical and can employ one or more submerged arc welding passes or a combination of various arc welding processes for adding filler metal between plates 10, 12.

Figure 5:
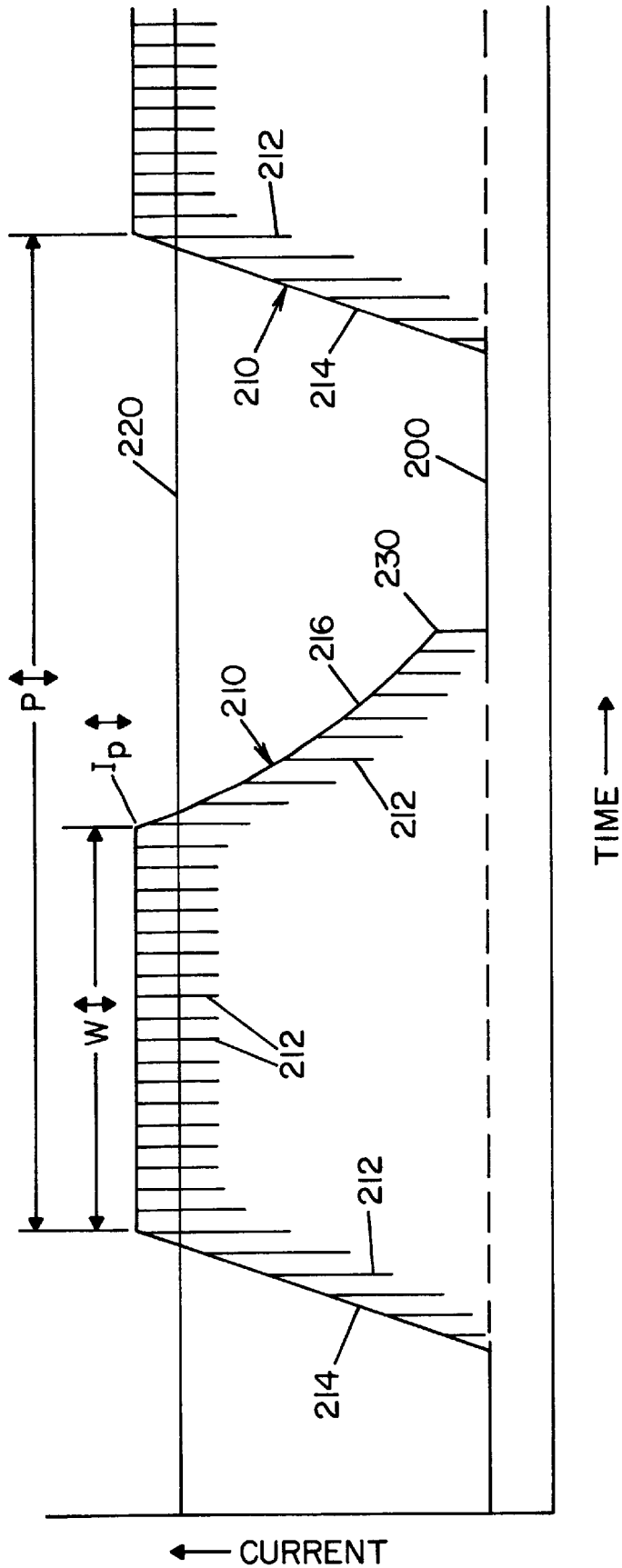

To employ a single electrode for the root pass process, the present invention utilizes a small diameter electrode which is moved relatively fast to fill a gap in the range of 0.03–0.12 using an electrode wire feed rate of about 450–550 inches/minute. To accomplish this objective, the DC current used for melting electrode E is a pulsed DC current schematically illustrated in FIG. 5. A background current 200 is maintained continuously on the electrode E preventing arc A from being extinguished. A series of pulses 210 are created at a preselected pulse rate to create a period P which may be adjusted to control the heat in the root pass welding process. Each pulse has a peak current $I_p$ and a width W, both of which are adjustable by the power supply 100, as is the pulse rate. The pulses 210 are created by a multitude of closely spaced current segments 212 forming the desired shape of the pulses, which shape includes a leading edge 214 and a trailing edge 216. The area under the illustrated curves defining the pulses, together with the rate of the pulses, is used to control the actual energy used in creating the root pass. This is a novel approach and allows the implementation of a process for welding two heavy plates 10, 12 from one side using a single electrode movable rapidly along the gap between the plates. In the past, efforts to use a single electrode employed a high DC current represented by current level 220 in FIG. 5. A high inductance was required to maintain this high current level. For that reason, there is no control over the heating in the root pass molten metal and burn through or overheating of the molten metal or base material could not be avoided. Thus, when the metal cooled there was often imperfections such as cracks or incipient cracks in the molten metal forming the root pass. Thus, single electrode one sided welding was not used commercially for heavy plates. The uniquely shaped pulses are used with a single electrode so a small single electrode moved at a high speed can create the desired high quality root pass R. To control the energy used to melt the metal forming the root pass, the peak current, the width and the pulse rate of pulses 210 are adjusted during the welding operation. In addition, it is possible to chop the current rapidly when a preselected amount of energy has been created by pulses 210. This action is illustrated at area 230 of pulse 210 shown in FIG. 5. By controlling the heat when using a small diameter electrode being fed at a relatively rapid wire feed speed, a successful arc welding method is provided. Adjustment of the rate of movement of electrode E along channel 30 compensates for different gap widths encountered during the welding operation.

The following example is an implementation of the present invention:

| | |
|---|---|
| Plate | ASTM A131, DH36 |
| Thickness | ¾ inch |
| Joint | 45 deg. inc. angle with .03 to .12 inch gap tolerance |
| Copper backup bar | 3/32" recess |
| Backup flux | Lincoln 801 BF |
| Electrode | .045" Outershield MC-710H |
| Polarity | DC+ (pulse) |
| WFS | 525"/min. |
| Volts | 29 |
| Amps | 275–300 |
| E.S.O. | ⅞" |
| Shielding gas | 90% Argon/10% $CO_2$ |
| Travel speed | 11–15"/min. |
| Torch angle | 15–20 deg. push | when the plates are stainless steel, to resist corrosion in seawater, etc., the electrode is a solid or cored stainless steel electrode having a relatively small diameter. It has also been found that a 1.0 mm duplex stainless steel electrode with a shielding gas 98% Argon and 2% $CO_2$ produces favorable results.

Having thus defined the invention, the following is claimed:

1. A method of welding together two steel plates with a thickness greater than about ⅜ inches from one side of said plates, said method comprising the steps of:
   (a) tapering a generally straight edge of said plates to form an included angle in the range of about 40–60° with a nose at the protruding portion of each edge;
   (b) positioning said plates with said edges spaced from each other to define an elongated channel with said nose of each edge at the bottom of said channel and spaced from each other to define an elongated generally straight gap with a width g;
   (c) providing a backing layer of granular flux below said gap;
   (d) moving an electrode having a diameter of less than approximately 0.05 inches at a wire feed speed of at least about 450 inches per minute along and in said channel and slightly above said bottom noses;
   (e) applying a DC current passed between said electrode and said noses to cause an arc welding process to melt said electrode and said noses to form a root pass in the lower area of said channel at said gap and between said edges of said plates;
   (f) controlling said DC current to control the output in a desired fashion to deliver a set of current pulses, said pulses being formed at a given rate and by a multitude of closely spaced current segments having controlled magnitudes to determine, with said rate, the energy delivered by said current pulses; and,
   (g) adjusting travel speed to accommodate variations in the gap between the plates being joined.

2. A method as defined in claim 1 wherein said diameter of said electrode is in the range of about 0.030–0.045 inches.

3. A method as defined in claim 1 wherein said gap width g is in the general range of 0.03–0.12 inches.

4. A method as defined in claim 1 wherein said electrode speed is in the general range of 450–550 inches per minute.

5. A method as defined in claim 1 wherein said current segments of each current pulse are created at a rate between 10–20 kHz.

6. A method as defined in claim 1 wherein said continuous output current is adjusted to control the heat in said lower area.

7. A method as defined in claim 6 wherein said control is during said arc welding process.

8. A method as defined in claim 1 wherein said energy of said current pulses is adjusted to control the heat in said lower area.

9. A method as defined in claim 8 wherein said adjustment is during said arc welding process.

10. A method as defined in claim 1 including the additional step of filling at least a part of said channel by a submerged arc welding process after formation of said root pass.

11. A method as defined in claim 10 wherein said submerged arc welding process is performed during but delayed from said root pass welding process.

12. A method as defined in claim 1 wherein said pulses are created by a switching type power supply.

13. A method as defined in claim 1 wherein said electrode has a pool pushing angle of about 15–20°.

14. A method as defined in claim 1 wherein said travel speed of said electrode is in the general range of 8–25 inches per minute.

15. A method of welding together two steel plates with a thickness greater than about ⅜ inches from one side of said plates, said method comprising the steps of:
   (a) tapering a generally straight edge of said plates to form an included angle in the range of about 40–60° with a nose at the protruding portion of each edge;
   (b) positioning said plates with said edges spaced from each other to define an elongated channel with said nose of each edge at the bottom of said channel and spaced from each other to define an elongated generally straight gap with a width g;
   (c) providing a backing layer of granular flux below said gap;
   (d) moving an electrode having a diameter of less than approximately 0.05 inches at a wire feed speed of at least about 450 inches per minute along and in said channel and slightly above said bottom noses;
   (e) applying a DC current passed between said electrode and said noses to cause an arc welding process to melt said electrode and said noses to form a root pass in the lower area of said channel at said gap and between said edges of said plates;
   (f) controlling said DC current to control the output in a desired fashion to deliver a set of current pulses, said pulses being formed at a given rate and by a multitude of closely spaced current segments having controlled magnitudes to determine, with said rate, the energy delivered by said current pulses; and,
   (g) adjusting said current pulses to prevent overheating in said lower area as said root pass is being created.

16. A method as defined in claim 15 wherein said adjusting step involves the step of increasing the peak magnitude of said current segments.

17. A method as defined in claim 15 wherein said adjusting step involves the step of changing the rate of said pulses.

18. A method as defined in claim 15 wherein said diameter of said electrode is in the range of about 0.030–0.045 inches.

19. A method as defined in claim 15 wherein said gap width g is in the general range of 0.03–0.12 inches.

20. A method as defined in claim 15 wherein said electrode speed is in the general range of 450–550 inches per minute.

21. A method as defined in claim 15 wherein said current segments of each current pulse are created at a rate between 10–20 kHz.

22. A method as defined in claim 15 wherein said continuous output current is adjusted to control the heat in said lower area.

23. A method as defined in claim 15 wherein said energy of said current pulses is adjusted to control the heat in said lower area.

24. A method as defined in claim 23 wherein said adjustment is during said arc welding process.

25. A method as defined in claim 15 including the additional step of filling at least a part of said channel by a submerged arc welding process after formation of said root pass.

26. A method as defined in claim 15 wherein said pulses are created by a switching type power supply.

27. A method as defined in claim 15 wherein said electrode has a pool pushing angle of about 15–20°.

* * * * *